United States Patent
Elboim et al.

(10) Patent No.: US 9,256,564 B2
(45) Date of Patent: Feb. 9, 2016

(54) TECHNIQUES FOR IMPROVING THROUGHPUT AND PERFORMANCE OF A DISTRIBUTED INTERCONNECT PERIPHERAL BUS

(71) Applicant: QUALCOMM INCORPORATED, San Diego, CA (US)

(72) Inventors: Yaron Elboim, Haifa (IL); Ran Vayda, Binyamina (IL); Ran Eliyahu Hay, Rosh Hahayin (IL)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/723,261

(22) Filed: Dec. 21, 2012

(65) Prior Publication Data

US 2013/0185472 A1    Jul. 18, 2013

Related U.S. Application Data (60) Provisional application No. 61/587,460, filed on Jan. 17, 2012.

(51) Int. Cl.
  *G06F 13/36* (2006.01)
  *G06F 13/40* (2006.01)
  *G06F 12/08* (2006.01)

(52) U.S. Cl.
  CPC ........ *G06F 13/4027* (2013.01); *G06F 12/0862* (2013.01); *G06F 2212/507* (2013.01)

(58) Field of Classification Search
  CPC .............................................. G06F 2212/507
  USPC ........................................ 710/310; 711/141
  See application file for complete search history.

(56) References Cited

U.S. PATENT DOCUMENTS

| | | | | |
|---|---|---|---|---|
| 6,219,769 B1 * | 4/2001 | Strongin et al. | | 711/158 |
| 6,226,721 B1 * | 5/2001 | Strongin et al. | | 711/158 |
| 6,253,288 B1 * | 6/2001 | McAllister et al. | | 711/137 |
| 6,298,418 B1 * | 10/2001 | Fujiwara et al. | | 711/144 |
| 6,321,307 B1 * | 11/2001 | Maguire et al. | | 711/146 |
| 6,381,672 B1 * | 4/2002 | Strongin et al. | | 711/105 |
| 6,993,633 B1 * | 1/2006 | Sakakibara et al. | | 711/146 |
| 7,047,374 B2 * | 5/2006 | Sah et al. | | 711/158 |
| 7,051,195 B2 * | 5/2006 | Gaither et al. | | 712/235 |
| 7,188,209 B2 * | 3/2007 | Pettey et al. | | 710/317 |
| 7,188,263 B1 * | 3/2007 | Rubinstein et al. | | 713/300 |
| 7,308,523 B1 * | 12/2007 | Ngai | | 710/313 |
| 7,600,078 B1 * | 10/2009 | Cen et al. | | 711/137 |
| 7,627,804 B2 * | 12/2009 | Bains | | 714/781 |
| 7,631,128 B1 * | 12/2009 | Sgrosso et al. | | 710/105 |
| 7,937,533 B2 * | 5/2011 | Allen et al. | | 711/137 |
| 8,131,941 B2 * | 3/2012 | Kinter | | 711/141 |
| 8,417,920 B2 * | 4/2013 | Stevens et al. | | 712/220 |

(Continued)

*Primary Examiner* — Paul R Myers (57) ABSTRACT

A method for accelerating execution of read operations in a distributed interconnect peripheral bus is provided. The method comprises generating a first number of speculative read requests addressed to an address space related to a last read request served on the bus; sending the speculative read requests to a root component connected to the bus; receiving a second number of read completion messages from the root component of the bus; and sending a read completion message out of the received read completion messages component to the endpoint component only if the read completion message is respective of a real read request or a valid speculative read request out of the speculative read requests, wherein a real read request is issued by the endpoint component.

16 Claims, 8 Drawing Sheets

(56) References Cited

U.S. PATENT DOCUMENTS

| | | |
|---|---|---|
| 8,539,163 B1* | 9/2013 | Sivasubramanian et al. . 711/137 |
| 2003/0140202 A1* | 7/2003 | LaBerge ................... 711/154 |
| 2007/0124341 A1* | 5/2007 | Lango et al. ............... 707/202 |
| 2007/0130372 A1* | 6/2007 | Irish et al. ..................... 710/5 |
| 2008/0184049 A1* | 7/2008 | Mathur et al. ............. 713/320 |
| 2009/0089510 A1* | 4/2009 | Lee et al. .................. 711/141 |
| 2009/0157919 A1* | 6/2009 | Dodson et al. .............. 710/57 |
| 2011/0066812 A1 | 3/2011 | Qin et al. |
| 2011/0222552 A1* | 9/2011 | Mital et al. ................ 370/412 |
| 2012/0166692 A1 | 6/2012 | Wang et al. |
| 2013/0185517 A1 | 7/2013 | Elboim et al. |
| 2014/0089592 A1* | 3/2014 | Biswas et al. ............. 711/133 |

\* cited by examiner

TECHNIQUES FOR IMPROVING THROUGHPUT AND PERFORMANCE OF A DISTRIBUTED INTERCONNECT PERIPHERAL BUS

CROSS REFERENCE TO RELATED APPLICATIONS

The application claims the benefit of U.S. provisional application No. 61/587,460 filed Jan. 17, 2012, the contents of which are herein incorporated by reference.

TECHNICAL FIELD

The present invention relates generally to interconnect buses for providing peripheral component connectivity over a distributed link.

BACKGROUND

Peripheral component interconnect Express (PCI Express or PCIe) is a high performance, generic and scalable system interconnect for a wide variety of applications ranging from personal computers to embedded applications. The PCIe bus implements a serial, full duplex, multi-lane, point-to-point interconnect, packet-based, and switch based technology. Current versions of PCIe buses allow for a transfer rate of 2.5 Giga bit per second (Gbps), 5 Gbps, or 8 Gbps, per lane, with up to 32 lanes.

Figure 1:
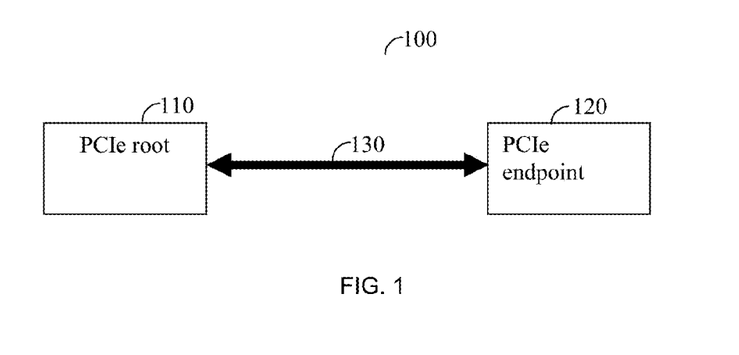
FIG. 1 is a block diagram showing a typical PCIe bus architecture.

The roundtrip time of a PCIe bus is a major factor in degrading the performance of the bus. As illustrated in FIG. 1, the roundtrip is the time period elapsed from the transmission of data over a link 130, for example, by a PCIe root 110, to the acknowledgment of the data reception by a PCIe endpoint 120.

The roundtrip time of the PCIe bus 100 depends on the delay of link 130 between the PCIe root 110 and the PCIe endpoint 120. Typically, this delay is due to an acknowledgement (ACK), and flow control update latencies, caused by the layers of a PCIe bus. Abstractly, the PCIe is a layered protocol bus, consisting of a transaction layer, a data link layer, and a physical layer.

The data link layer waits to receive an ACK signal for transaction layer packets during a predefined time window. If an ACK signal is not received during this time window, the transmitter (either at the PCIe root 110 or endpoint 120) resends the unacknowledged packets. This results in inefficient bandwidth utilization of the bus as it requires re-transmission of packets that do not have a data integrity problem. That is, high latency on the link 130 causes poor bandwidth utilization.

In addition, a typical PCIe bus includes a credit mechanism utilized to avoid a receiver buffer overflow. As the latency of a PCIe bus is typically low, the PCIe root 110 and endpoint 120 often implement small receiver buffers with a small number of credits. The fast PCIe link enables fast updates of flow controls (credits) and full bus performance. However, when the bus latency increases, the small number of flow control credits is a major limitation. Even if the receiver buffer is available, the flow control packet delay causes the transmitter (either at the PCIe root 110 or endpoint 120) to be idle for a long period prior to sending data. The result is an idle PCIe bus with low bandwidth utilization.

The PCIe protocol allows read and write operations. In the write operation issued between the PCI root and an endpoint, no feedback is required to wait for the completion of the operation. In addition, multiple write operations can be initiated in parallel. However, for a read operation a feedback is required, which indicates completion of the read operation. For example, when a PCIe root's memory reads data from an external disk (connected to the PCIe), the PCIe root should wait for a read completion message from the endpoint connected to the external disk. In addition, only a limited number of read operations can be initiated.

In a typical PCIe bus architecture, the PCIe root 110 is directly coupled to the PCIe endpoint 120. In fact, the PCIe root 110 and the endpoint 120 are typically connected on the same electric board. Thus, the link 130 is a wired electric connection. The roundtrip time is usually very short and therefore the PCIe is not designed for operating properly in high latency. In contrast, a distributed peripheral interconnect bus connects a PCIe root and endpoints that are located remotely from each other. For example, such a bus allows the connectivity between a PCI root and endpoints over a wireless medium.

Figure 3:
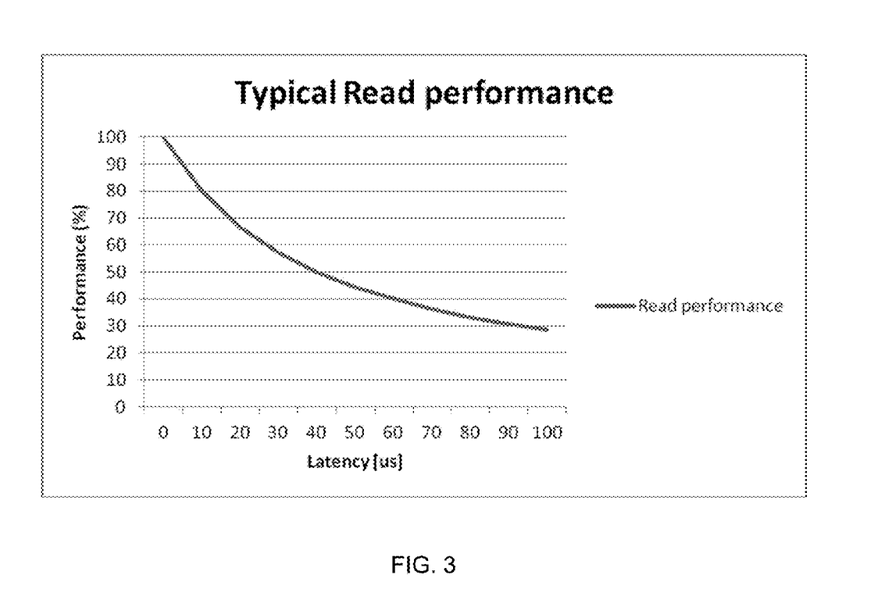
FIG. 3 is a diagram illustrating the performance of read operations in response to the latency of the PCIe bus.

When the link between the components of the PCIe bus is de-coupled, for example, to allow PCIe connectivity over a wireless medium, the latency of the link and response time of a PCI's bus components is significantly increased. As a result, the performance of the bus, especially when performing read operations, is severely degraded. As an example, performance of read operations in response to the latency of the bus is illustrated in FIG. 3, which illustrates that when the latency of a PCIe bus is 0 microsecond (us) the utilization of the bus is 100%, and when the latency is increased to 100 microsecond (us), the utilization of the PCIe bus is 30%.

Thus, it would be advantageous to provide a high performance interconnect bus that would allow efficient distributed connectivity.

SUMMARY

Certain embodiments disclosed herein include a method for accelerating execution of read operations in a distributed interconnect peripheral bus. The method comprises generating a first number of speculative read requests addressed to an address space related to a last read request served on the bus; sending the speculative read requests to a root component connected to the bus; receiving a second number of read completion messages from the root component of the bus; and sending a read completion message out of the received read completion messages component to the endpoint component only if the read completion message is respective of a real read request or a valid speculative read request out of the speculative read requests, wherein a real read request is issued by the endpoint component.

Certain embodiments disclosed herein also include a method for accelerating execution of read operations in a distributed interconnect peripheral bus. The method comprises receiving a read request from a root component connected the bus; computing a wait time for the transmission of the received read request; waiting for the computed wait time to elapse; and transmitting the received read request to an endpoint component connected to the bus once the wait time has elapsed, thereby ensuring that read completion messages respective of the received read request are sent in order from the endpoint component.

Certain embodiments disclosed herein also include a distributed interconnect peripheral bus apparatus. The apparatus comprises a downstream bridge coupled to an endpoint component, wherein the downstream bridge includes a speculative read mechanism; an upstream bridge connected to a root component, wherein the upstream bridge includes a spreader mechanism, wherein the spreader mechanism is configured to accelerate execution of read operations on the bus by spreading read requests issued by the root component, and the speculative read mechanism is configured to accelerate execution of read operations on the bus by speculating read requests to be issued by the root component, wherein the root component and the endpoint component communicate over a distributed medium.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In view of the shortcomings discussed above, certain embodiments disclosed herein enable improvement of the performance of distributed interconnect peripheral buses, such as a distributed PCIe bus. Specifically, the embodiments disclosed herein allow the acceleration of execution and completion read operations in such buses where the link between the bus component (e.g., root and endpoint) is decoupled. In a particular embodiment, the link may be a wireless link.

Figure 2:
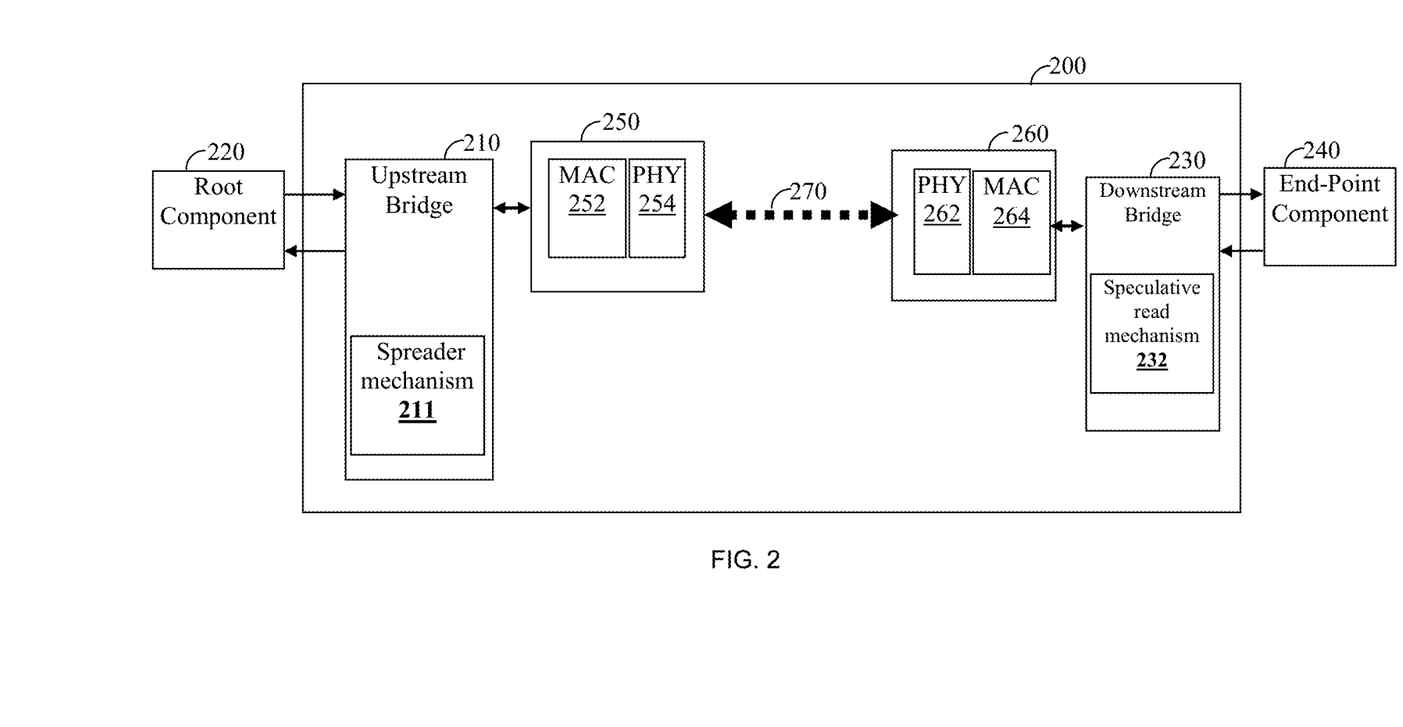
FIG. 2 is a block diagram of a distributed interconnect bus apparatus utilized to describe various embodiments disclosed herein.

An exemplary and non-limiting diagram of a distributed interconnect bus apparatus 200 utilized to describe various embodiments the invention is shown in FIG. 2. The apparatus 200 comprises an upstream bridge 210 connected to a root component 220 and a downstream bridge 230 connected to an endpoint component 240. The upstream and downstream bridges 210 and 230 communicate over a link 270 which is the medium used to transfer the data between the components 220 and 240. The medium may be, but is not limited to, air, a copper cable, a fiber optic, and so on. That is, the bus apparatus 200 forms a distributed bus for transferring data between remote peripheral devices coupled to the root component 220 and endpoint component 240. The endpoint component 240 may be connected to a controller of another data bus or peripheral device including, but not limited to, SATA, USB, and the like.

The transport protocol used to carry data between the components 220 and 240 may be, but is not limited to, WiGig, IEEE 802.11x (Wi-Fi), Ethernet, Infiniband, and like. With this aim, each of the bridges 210 and 230 includes or is connected to a physical (PHY) layer module (254, 262) and a MAC layer module (252, 264) compliant with the transport protocol.

In one embodiment, the root component 220 and bridge component 240 are PCIe components, and the bridges 220 and 240 implement the PCIe protocol. Thus, the distributed interconnect bus apparatus 200 is compliant with the PCIe protocol, for example, version 2.1 and its preceding versions.

According to various embodiments disclosed herein, in order to accelerate the performance of read operations in the distributed interconnect bus apparatus 200, at least the upstream bridge 210 includes a spreader mechanism 211, while the downstream bridge 230 comprises a speculative read mechanism 232 whose operations are described in detail below. In certain configurations, the upstream bridge 210 may also include a speculative read mechanism. In one embodiment, the speculative read mechanisms can work in conjunction with the spreader mechanisms 211 to spread speculative read requests.

In a normal operation of a PCIe bus, the components 220, 240 send multiple read requests to read data from the 'opposite side'. Each component sends a number of 'n' read completion messages for each read request, then the requesting component can send another read request, assuming the read request quota is filled up, only when the 'n' read completion messages are received. The read request quota is the number of read requests that can be initiated by the requesting component without waiting for 'n' completion messages. The read completion messages can be interleaved.

Figure 4A:
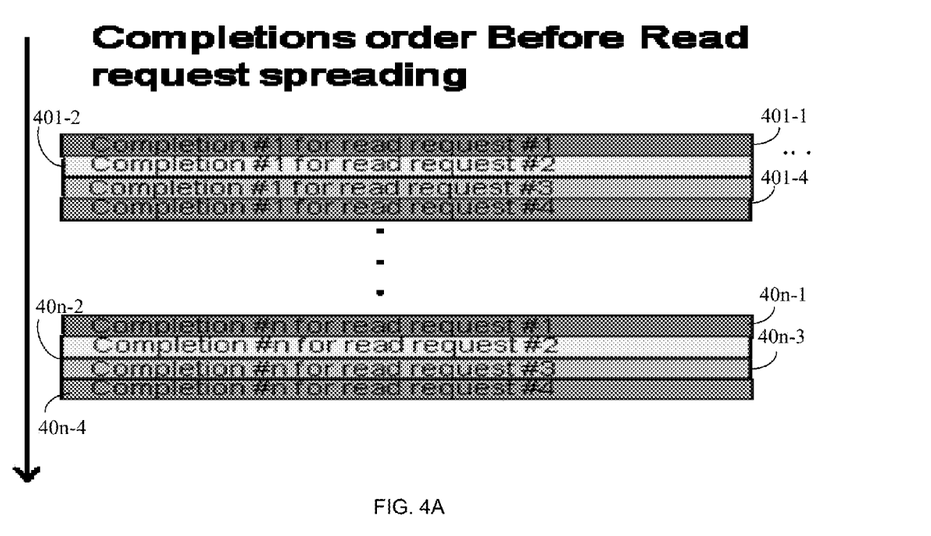
FIGS. 4A and 4B are diagrams illustrating the order in which read completion messages are received without and with the spreader mechanism implemented according to one embodiment.

For example, as shown in FIG. 4A, completion message #1 (401-1), sent in response to a read request #2, follows completion message #1 (401-2) for a read request #1 from the root 220. Thereafter, a completion message #n (40n-1, 40n-2, 40n-3, and 40n-4) for all read requests #1, 2, 3, and 4 follow each other. As can be understood from the example illustrated in FIG. 4A, a new read request can be initiated only after receiving a number of 'n' completion messages for each read request. In the example discussed with respect to FIG. 4A, the read request quota is 4. Thus, it may take substantial time until 'n' completion messages are received, and a new read request can be initiated.

Figure 4B:
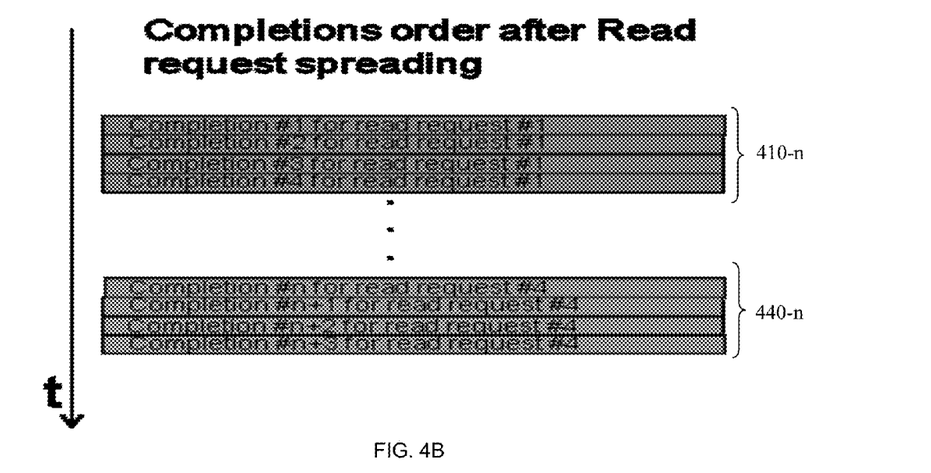

According to one embodiment, the spreader mechanism 211 receives a read request and then computes a waiting time. The waiting time is a function of the size of data that should be read. As an example, for a read request size of 512B, the round trip time of all 512B data completion from that host, calculated based on a transfer rate of 1.6 Gbps (which approximately that effective PCIe transaction layer Bandwidth) is about 2.5 us. The spreader mechanism 211 then waits for a time period equal to the computed waiting before sending the read request (i.e., initiating a read operation on the bus). Thus, the spreader mechanism 211 spreads the issuance and transmission of read requests sent to the endpoint component 240. As a result, the read completion messages for a specific read request are received in order. For example, as shown in FIG. 4B, the completion messages as received after spreading the read requests are not interleaved. As depicted in FIG. 4B, a number 'n' of completion messages for a read request #1 (collectively labeled as 410-*n*) are received one after another. Thereafter, a number 'n' of completion messages for a read request #4 (collectively labeled as 440-*n*) are also received one after another.

Figure 5:
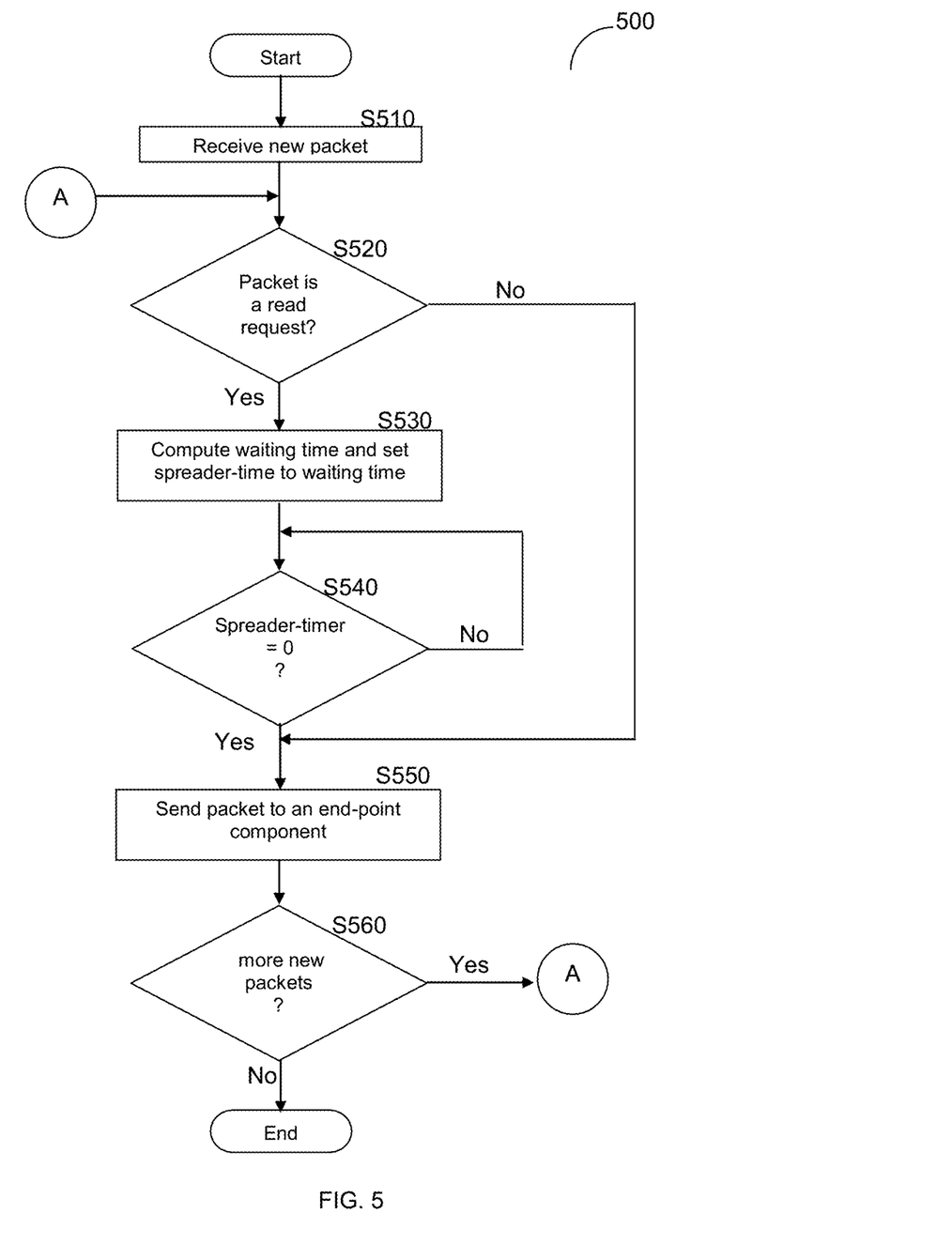
FIG. 5 is a flowchart illustrating the operation of a spreader mechanism implemented according to one embodiment.

FIG. 5 shows an exemplary and non-limiting flowchart 500 illustrating the process performed by the spreader mechanism 211 according to one embodiment disclosed herein. At S510, a new packet is received at the spreader mechanism 211. In one embodiment, the packet is a transaction layer packet of the PCIe bus. At S520, it is checked if the packet is a read request, and if so, execution proceeds to S530; otherwise, at S550, the packet is sent to the end-point component 240. For example, the packet can be placed in an upstream port in the upstream bridge 210 of the bus apparatus 200.

At S530, a waiting time is computed and a "spreader-timer" is set according to the computed time. As noted above, the waiting time is a function of the size of data that should be read. At S540, it is checked if the spreader-timer equals to zero, i.e., if the computed waiting time has elapsed. If so, execution continues with S550, where the received packet is sent to the end-point component; otherwise, execution waits at S540 until the timer reaches to zero. In one implementation, the spreader-timer counts backwards, but in another implementation the spreader-timer can be set to zero and then counts until it reaches the computed waiting time. At S560, it is checked if new packets have arrived, and if so execution returns to S520; otherwise, execution terminates.

Figure 6:
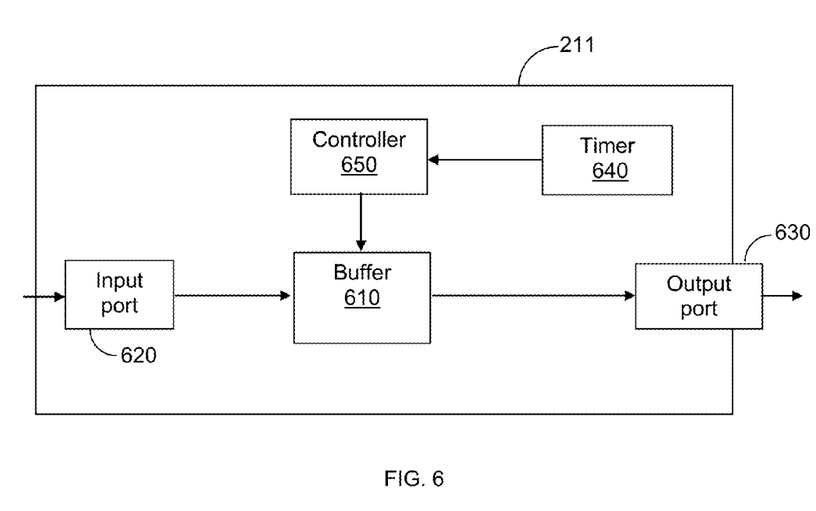
FIG. 6 is a block diagram of a spreader mechanism implemented according to one embodiment.

FIG. 6 shows an exemplary and non-limiting block diagram of the spreader mechanism 211 implemented in accordance with one embodiment. The spreader mechanism 211 includes a buffer 610 coupled to an input port 620 and an output port 630, a timer 640, and a controller 650. The controller 650 computes the waiting time and sets the timer 640 accordingly. Packets to be sent to an end-point component 240 are received from the root component 220 through the input port 620 and placed in the buffer 610. The packets are transaction layer packets of the PCIe bus. The controller 650 determines for each packet in the buffer 610 if it is a read request. Once the timer 640 indicates that the waiting has elapsed, the controller 650 instructs the buffer 610 to place a packet being a read request message in the output port 630.

The speculative read mechanism 232, disclosed herein, increases the throughput of the distributed bus apparatus 200. With this aim, the speculative read mechanism 232 generates read requests to the root component without receiving such requests from the endpoint component. Such read requests are referred to hereinafter as speculative read requests, as the requests attempt to speculate the actual read requests that are likely to be generated by the endpoint component. For example, the read request would be directed to read data from an address space that is likely to be requested by the endpoint component.

In one embodiment, the speculative read mechanism 232 is triggered upon reception of a consecutive predefined number of real read requests directed to the same address space. Once the mechanism is triggered, the downstream bridge 230 by means of the mechanism 232 issues a predefined number of speculative read requests to read data starting from the address of the last read request issued by the root component. The size of the data to be read is also predefined (e.g., 4 KB, 8 KB, 12 KB, or 16 KB). Once a 'real' read request is received from the endpoint component 240, the mechanism 232 matches this request to a first issued speculative read request, and if a match exists the read data, together with read completion messages received from the speculative read, are sent to root component 240 via the upstream bridge. This is true for each speculative read request issued by the mechanism 232. Otherwise, if the speculative read request does not match the real read request, the read data is ignored and read completion messages that are received in response to the speculative reads are dropped.

It should be noted that the downstream bridge 230, and hence the endpoint component 240 as well as the root component 240 and its upstream bridge 240, does not know if the read request is a speculative read request. Thus, a speculative read request is treated as a real read request by the upstream bridge 240 and the root component 220. It should be further noted that if the maximum number of predefined speculative read requests has been sent, then a new speculative read request can be issued only when a number of 'n' read completion messages respective of a speculative read request are received.

Figure 7:
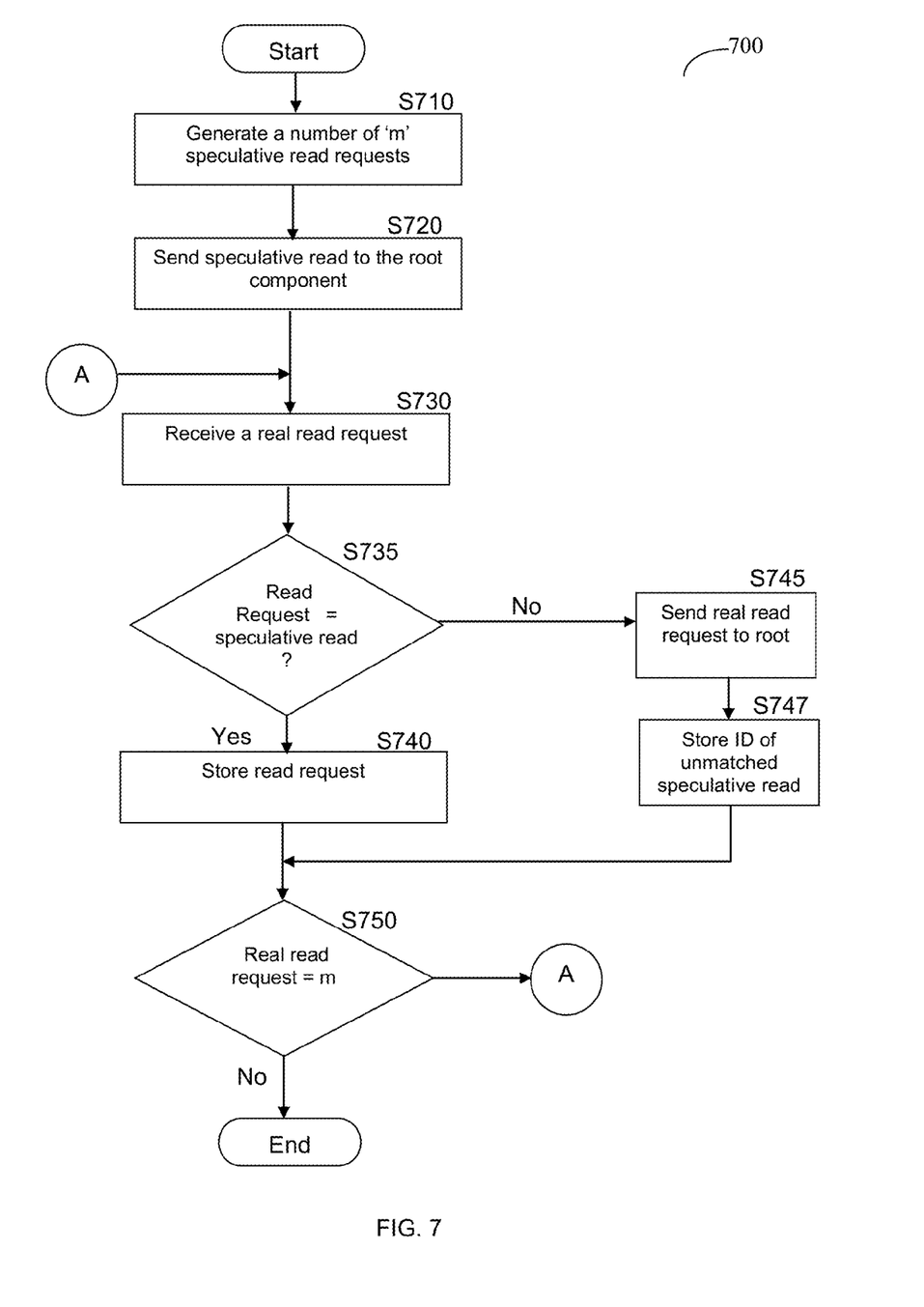
FIGS. 7 and 8 are flowcharts illustrating the operation of a speculative read mechanism according to one embodiment.

The operation of the speculative read mechanism is further discussed with reference to FIGS. 7 and 8. FIG. 7 shows an exemplary and non-limiting flowchart 700 illustrating the operation of the speculative read mechanism when generating and sending a speculative read request according to one embodiment. The operation of the speculative read mechanism is triggered when a consecutive number of read requests directed to the same address space are received and there are no speculative read requests pending.

At S710, a predefined number of 'm' (m is an integer greater than 1) speculative read requests are generated to read data starting from the address of the last 'real' read request issued by the endpoint component 240. In one embodiment, the number of speculative read requests is 4. At S720, the speculative read requests are sent to the root component 240 through the upstream bridge 210 (over the distributed medium).

At S730, a 'real' read request is received from the endpoint component 210. At S735, it is checked if the received 'real' read request is identical to a respective speculative read request. For example, if the real read request is the first received request it should match the first speculative read, and if the real read request is the second received request it should match the second speculative read, and so on. The two requests are considered identical if they are at least directed to the same address space. If S735, results in a Yes answer, execution continues to S740; otherwise, at S745, the received 'real' read request is sent to the end-point component 240. At S747, an ID of a respective speculative read request that does not match the 'real' read request is saved, so that any completion messages related to that unmatched speculative read request are ignored. At S740, the received 'real' read request is stored in the speculative read mechanism 232, thus it is not sent to the endpoint component 240.

At S750, it is checked if the number of the received 'real' read requests equals to the number of the generated respective speculative read requests (m). If so, execution proceeds to a state that waits for read completion messages (see FIG. 8); otherwise, execution returns to S730. It should be noted that S730 through S750 are performed for each of the 'm' real read requests initiated by the endpoint component.

Figure 8:
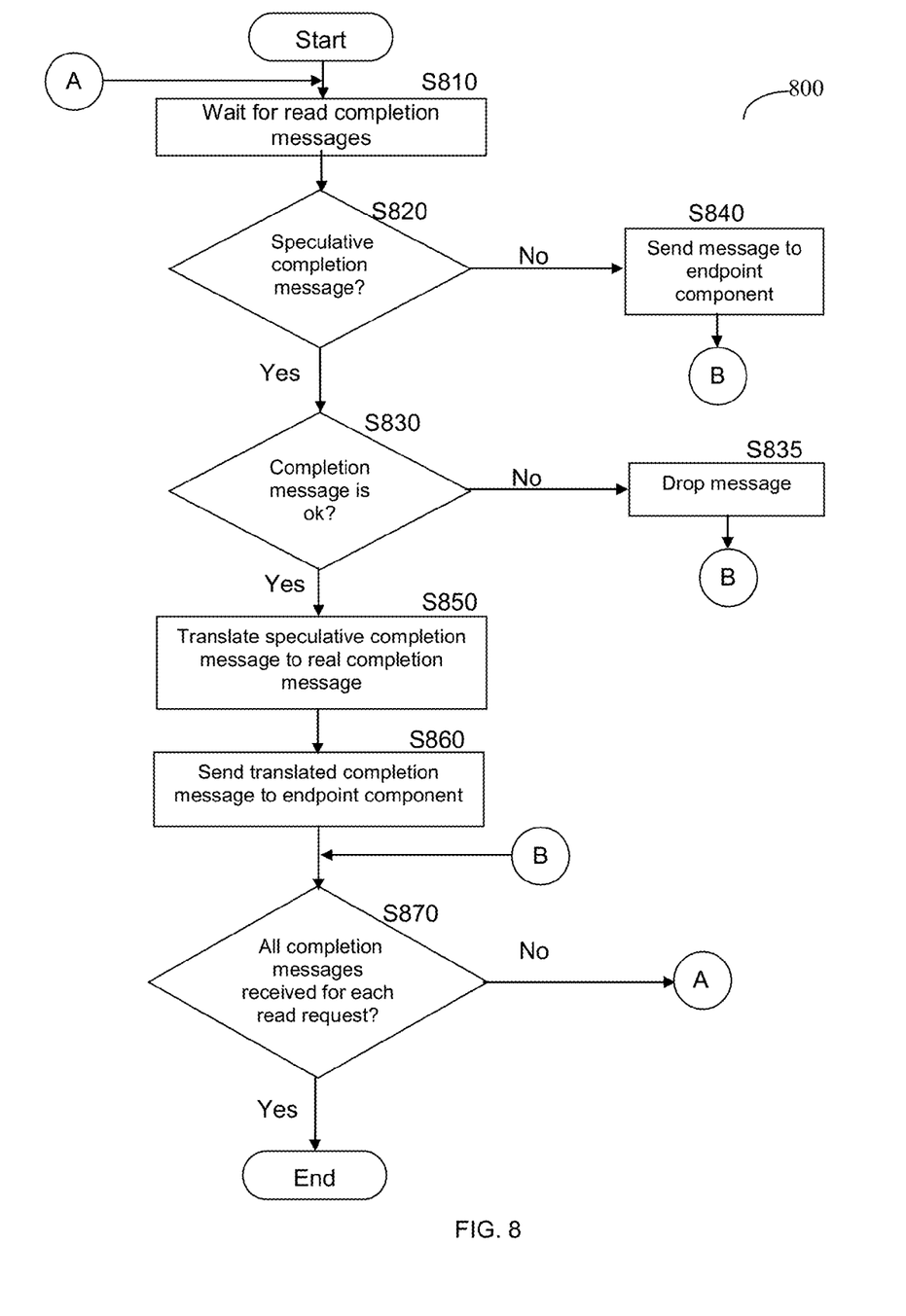

FIG. 8 shows an exemplary and non-limiting flowchart 800 illustrating the operation of the speculative read mechanism 232 for handling the read completion messages according to one embodiment. At S810, the speculative read mechanism 232 waits to receive read completion messages sent from the root component 240. At S820, it is checked if a received completion message corresponds to a speculative read request, and if so, execution proceeds to S830; otherwise, at S840, the received completion message is sent to the endpoint component 240. As noted above, the read requests being sent to the root component 220 can be either speculative or real, thus the check at S820 is required.

At S830, another check is made to determine if the received read completion message corresponds to one of the speculative read requests that should be ignored. As noted above, the IDs for unmatched speculative read requests are saved, thus if a completion message having an ID corresponds to one of the stored IDs is dropped (S835). In one embodiment, an ID includes a tag and completer id fields of a transaction layer packet header."

It should be noted that steps S830 and S835 ensure that if the speculative read request does not match the real read request, the read data is ignored and read completion messages that are received in response to the unmatched speculative read request are dropped.

If S830 results in a Yes answer, then, at S850, the received completion message of the speculative request is translated to include at least an ID of the respective 'real' read request (stored in the mechanism 232). This ensures that the root component 240 receives completion messages as if they were generated for the speculative read. At S860, the translated completion message is sent to the root component 240. At S870, it is checked if 'n' completion messages have been received for each of the 'm' read requests that were sent to the endpoint component 200, and if so execution terminates; otherwise, execution returns to S810.

The speculative read mechanism 232 further tracks the read completion message sent in response to the issued speculative read requests. As noted above, there is a limit to the number of read requests that can be sent out. Thus, the tracking of completion messages is required in order to allow issuance of new speculative read requests. According to one embodiment, the read completions countdown is executed for each one of the issued speculative read requests. That is, the completions countdown should count 'n' completion messages for each speculative read request. Only once all the read completion messages arrive, then additional speculative reads are allowed.

In one embodiment, the speculative read mechanism 232 can utilize the spreader mechanism 211 in order to spread the transmission of speculative read requests, thereby ensuring that read completion messages for a specific speculative read request are received in order.

It should be noted that the real or speculative read requests and completion messages are encapsulated in transaction layer packets. Packets that do not include read requests or read completion mechanisms are not handled by the speculative read mechanism.

Figure 9:
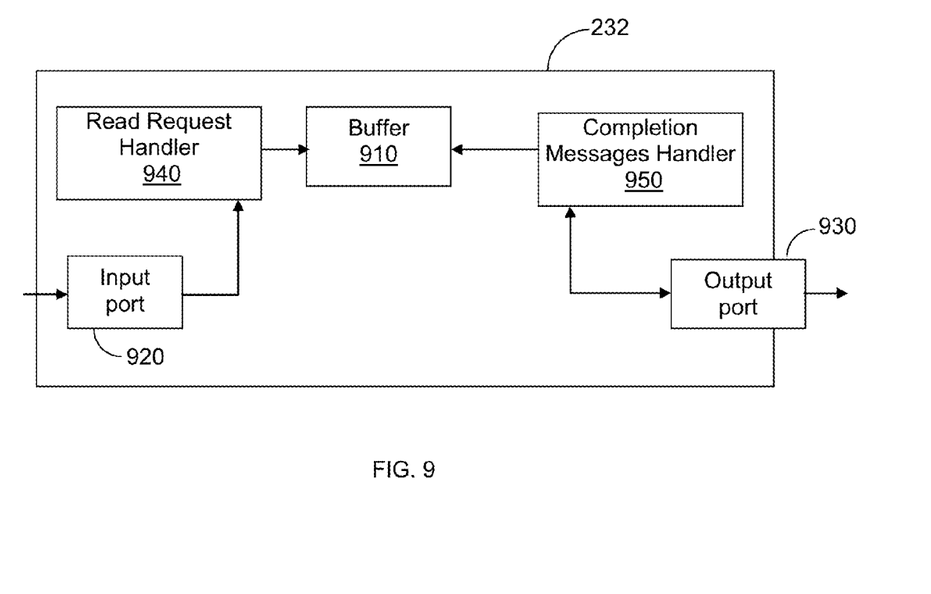
FIG. 9 is a block diagram of the speculative read mechanism implemented in accordance with one embodiment

FIG. 9 shows an exemplary and non-limiting block diagram of the speculative read mechanism 232 implemented in accordance with one embodiment. The speculative read mechanism 232 includes a buffer 910 coupled to a read requests handler 940 and a completion messages handler 950. The mechanism 232 also includes an input port 920 and an output port 930. Packets to be sent to a root component 220 are received from the endpoint component 240 through the input port 920 and placed in the buffer 910. The packets are transaction layer packets of the PCIe bus. The handlers 940 and 950 handle only packets that include either read requests or completion messages. The ports 920 and 930 provide interfaces for the endpoint and root components 240 and 220, respectively.

The buffer 910 is utilized to store real read requests and IDs of speculative read requests that should be ignored. The read requests handler 940 is configured to generate speculative read requests and handle the 'real' read requests as discussed in detail with reference to FIG. 7. The completion messages handler 950 is configured to generate speculative read requests and handle the 'real' read requests as discussed in detail with reference to FIG. 8.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for accelerating execution of read operations, comprising:
   generating a plurality of speculative read requests;
   sending a first number of the plurality of the speculative read requests to a device coupled to an endpoint component via a wireless medium;
   receiving of one or more read completion messages from the device;
   tracking a number of received read completion messages;
   receiving a real read request from the endpoint component;
   sending one of the one or more received read completion messages to the endpoint component if one of the one or more received read completion messages corresponds to the real read request or if one of the one or more received read completion messages corresponds to one of the first number of the plurality of speculative read requests; and
   sending a second number of the plurality of speculative read requests if the tracked number of received completion messages is greater than a threshold number.

2. The method of claim 1, further comprising:
   determining if the received real read request matches one of the plurality of speculative read requests;
   storing the received real read request if a match exists; and
   storing an identifier of one of the plurality of speculative read requests if a match does not exist, upon determining the one of the plurality of speculative read requests does not correspond to the one or more of the received read completion messages.

3. The method of claim 2, further comprising:
sending, to the device, the received real read request if a match does not exist.

4. The method of claim 3, further comprising:
checking if each of the received read completion messages is responsive to the received real read request or if one of the plurality of speculative read requests corresponds to the one or more received read completion messages;
sending, to the endpoint component, each of the received read completion messages responsive to the received real read request; and
translating each of the received read completion messages to match an identifier of a stored real read request for each of the received read completion messages responsive to the speculative read request of the plurality of speculative read requests corresponding to the one or more received read completion messages.

5. The method of claim 1, wherein the generation of the plurality of speculative read requests is triggered upon reception of a consecutive threshold number of real read requests directed to the same address space.

6. The method of claim 1, wherein the bus is a distributed peripheral component interconnect express (PCIe) bus.

7. An apparatus for accelerating execution of read operations, comprising:
circuitry coupled to an endpoint component, wherein the circuitry is coupled to a device via a wireless medium and is configured to:
generate a plurality of speculative read requests;
send a first number of the plurality of speculative read requests to the device;
receive one or more read completion messages from the device;
track a number of received read completion messages;
receive a real read request from the endpoint component;
send one of the one or more received read completion messages to the endpoint component if one of the more or more received read completion messages corresponds to the real read request or if one of the one or more received read completion messages corresponds to one of the first number of the plurality of speculative read requests; and
send a second number of the plurality of speculative read requests if the tracked number of received completion messages is greater than a threshold number.

8. The apparatus of claim 7, wherein the circuitry is further configured to:
determine if the received real read request matches one of the plurality of speculative read requests;
store the received real read request if a match exists; and
store an identifier of one of the plurality of speculative read requests, if a match does not exist, upon determining the one of the plurality of speculative read requests does not correspond to one or more of the received read completion messages.

9. The apparatus of claim 8, wherein the circuitry is further configured to send, to the device, the received real read request if a match does not exist.

10. The apparatus of claim 9, wherein the circuitry is further configured to:
check if each of the received read completion messages is responsive to the received real read request or if one of the plurality of speculative read requests corresponds to the one or more received read completion messages;
send, to the endpoint component, each of the received read completion messages responsive to the received real read request; and
translate each of the received read completion messages to match an identifier of a stored real read request for each of the received read completion messages responsive to the speculative read request of the plurality of speculative read requests corresponding to the one or more received read completion messages.

11. The apparatus of claim 7, wherein the circuitry is configured to generate the plurality of speculative read requests upon reception of a consecutive threshold number of real read requests directed to the same address space.

12. The apparatus of claim 7, wherein the circuitry is coupled to the device though a distributed peripheral component interconnect express (PCIe) bus.

13. An apparatus for accelerating execution of read operations, comprising:
circuitry coupled to a device, wherein the circuitry is coupled to an endpoint component over a wireless medium and is configured to:
receive a read request from the device;
compute a wait time for transmission of the received read request;
wait for the computed wait time to elapse;
transmit the received read request to the endpoint component once the wait time has elapsed; and
receive a new read request from the device after receiving greater than a threshold number of read completion messages from the device.

14. The apparatus of claim 13, wherein the wait time is computed as a function of a size of data to be read.

15. The apparatus of claim 13, wherein the circuitry is coupled to an endpoint component by a distributed peripheral component interconnect express (PCIe) bus.

16. The apparatus of claim 15, wherein the read request and the read completion messages are encapsulated in transaction layer packets of the distributed PCIe bus.

* * * * *